US011593064B2

(12) United States Patent
Denis et al.

(10) Patent No.: US 11,593,064 B2
(45) Date of Patent: Feb. 28, 2023

(54) AUDIO RENDERING DEVICE AND AUDIO CONFIGURATOR DEVICE FOR AUDIO STREAM SELECTION, AND RELATED METHODS

(71) Applicant: Google LLC, Mountain View, CA (US)

(72) Inventors: Florian Denis, Vincennes (FR); Thomas Girardier, Bourg la Reine (FR)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 17/368,474

(22) Filed: Jul. 6, 2021

(65) Prior Publication Data

US 2021/0334065 A1   Oct. 28, 2021

Related U.S. Application Data

(62) Division of application No. 17/148,348, filed on Jan. 13, 2021, now Pat. No. 11,080,011.

(Continued)

(51) Int. Cl.
*G06F 3/16* (2006.01)
*G10L 25/51* (2013.01)
*H04W 76/10* (2018.01)

(52) U.S. Cl.
CPC .............. *G06F 3/165* (2013.01); *G06F 3/167* (2013.01); *G10L 25/51* (2013.01); *H04W 76/10* (2018.02)

(58) Field of Classification Search
CPC ... H04L 41/0816; H04L 41/145; H04L 41/16; H04L 41/5067; H04L 43/045;
(Continued)

(56) References Cited

U.S. PATENT DOCUMENTS 8,396,576 B2   3/2013   Kraemer et al.
8,938,312 B2   1/2015   Millington et al.
(Continued)

OTHER PUBLICATIONS

Notice of Allowance dated Mar. 24, 2021 from U.S. Appl. No. 17/148,348, 32 pages.
(Continued)

*Primary Examiner* — Lun-See Lao
(74) *Attorney, Agent, or Firm* — Kilpatrick Townsend & Stockton LLP

(57) ABSTRACT

Audio rendering devices comprising at least one audio rendering unit for playing audio streams, processing circuit and a wireless communication unit for establishing wireless links and related method are disclosed. One audio rendering device is configured to receive a remote audio stream prioritization policy comprising one or more lists of associations between audio stream attributes and priority values, update a local audio stream prioritization policy based on the remote audio stream prioritization policy, identify audio streams available via wireless links, retrieve audio stream attributes of the available audio streams, select an available audio stream to be played among the available audio streams, based on the updated local audio stream prioritization policy and based on the audio stream attributes of the available audio streams, and play the selected audio stream, by the audio rendering unit of the audio rendering device.

20 Claims, 7 Drawing Sheets

Related U.S. Application Data

(60) Provisional application No. 62/992,318, filed on Mar. 20, 2020.

(58) Field of Classification Search
CPC ............ H04L 43/0852; H04L 43/0876; H04L 43/0888; H04L 43/10; H04L 47/2475; H04L 47/2483; H04L 63/105; H04L 65/1016; H04L 65/61; H04L 65/611; H04L 65/752; H04L 65/762; H04L 67/131; H04W 28/20; H04W 28/24; H04W 76/15; H04W 16/14; H04W 28/0268; H04W 48/18; H04W 72/0446; H04W 72/0493; H04W 72/10; H04W 76/10; H04W 36/0083; H04W 36/00837; H04W 4/00; H04W 40/02; H04W 8/205; H04W 84/005; G10L 25/51; H04B 1/3822
USPC .......................................... 381/56–58; 700/94
See application file for complete search history.

(56) References Cited

U.S. PATENT DOCUMENTS

| | | | |
|---|---|---|---|
| 8,971,546 B2 | 3/2015 | Millington et al. | |
| 8,990,364 B2 | 3/2015 | Spencer et al. | |
| 9,398,373 B2 | 7/2016 | Patil et al. | |
| 9,641,963 B2* | 5/2017 | Park | H04L 65/1083 |
| 9,706,319 B2 | 7/2017 | Peters et al. | |
| 10,013,232 B2 | 7/2018 | Hostage et al. | |
| 11,080,011 B1* | 8/2021 | Denis | H04W 76/10 |
| 2006/0291806 A1 | 12/2006 | Ikeda et al. | |
| 2007/0225840 A1 | 9/2007 | Yahata et al. | |
| 2008/0263219 A1 | 10/2008 | Bacchi et al. | |
| 2010/0202759 A1 | 8/2010 | Sasaki et al. | |
| 2013/0103779 A1* | 4/2013 | Bai | H04H 20/62 709/213 |
| 2013/0182798 A1 | 7/2013 | Lozano | |
| 2014/0348327 A1 | 11/2014 | Linde et al. | |
| 2015/0186943 A1 | 7/2015 | Chun et al. | |
| 2015/0312858 A1 | 10/2015 | Kerai | |
| 2016/0036704 A1* | 2/2016 | Xiao | H04L 47/2416 370/237 |
| 2016/0219358 A1 | 7/2016 | Shaffer et al. | |
| 2016/0359925 A1 | 12/2016 | Song | |
| 2017/0142731 A1* | 5/2017 | Gesquiere | H04L 12/40143 |
| 2017/0171798 A1 | 6/2017 | Song | |
| 2019/0082371 A1 | 3/2019 | Burt et al. | |

OTHER PUBLICATIONS

Restriction Requirement dated Feb. 26, 2021 from U.S. Appl. No. 17/148,348, 9 pages.

* cited by examiner a)

| Audio stream attribute | Priority value |
|---|---|
| Phone call | 1 |
| Music streaming | 2 |
| Youtube | 3 |
| Spotify | 4 |
| MAC1 | 5 |
| MAC2 | 6 | b)

| Available audio stream | Source device ID | Source device type ID | Content type ID | Content provider ID | Priority score |
|---|---|---|---|---|---|
| 1 | MAC1 | Smartphone | Phone call | Ø | 1 |
| 2 | MAC2 | Laptop | Music streaming | Spotify | 2 | c)

| Available audio stream | Source device ID | Source device type ID | Content type ID | Content provider ID | Priority score |
|---|---|---|---|---|---|
| 1 | MAC1 | Smartphone | Phone call | Ø | 5 |
| 2 | MAC2 | Laptop | Phone call | Ø | 6 |

Fig. 3 a)

| Content type ID | Priority value |
|---|---|
| Phone call | 1 |
| Music streaming | 2 |

| Source device type ID | Priority value |
|---|---|
| Smartphone | 1 |
| Laptop | 2 |

| Content provider ID | Priority value |
|---|---|
| Spotify | 2 |
| Youtube | 1 |
| Facebook | 3 |

| Source device ID | Priority value |
|---|---|
| MAC1 | 3 |
| MAC2 | 1 |
| MAC3 | 2 | b)

| Available audio stream | Source device ID | Source device type ID | Content type ID | Content provider ID | Priority score |
|---|---|---|---|---|---|
| 1 | MAC1 | Smartphone | Phone call | Ø | 1 |
| 2 | MAC2 | Laptop | Music streaming | Spotify | 2 | c)

| Available audio stream | Content type ID | Source device ID | Content provider ID | Source device type ID | Priority score |
|---|---|---|---|---|---|
| 1 | Phone call | MAC1 | Ø | Smartphone | 1 |
| 2 | Music streaming | MAC2 | Spotify | Laptop | 2 | d)

| Available audio stream | Content type ID | Source device ID | Content provider ID | Source device type ID | Priority score |
|---|---|---|---|---|---|
| 1 | Music streaming | MAC1 | Ø | Smartphone | 3 |
| 2 | Music streaming | MAC2 | Spotify | Laptop | 1 |

Fig. 4

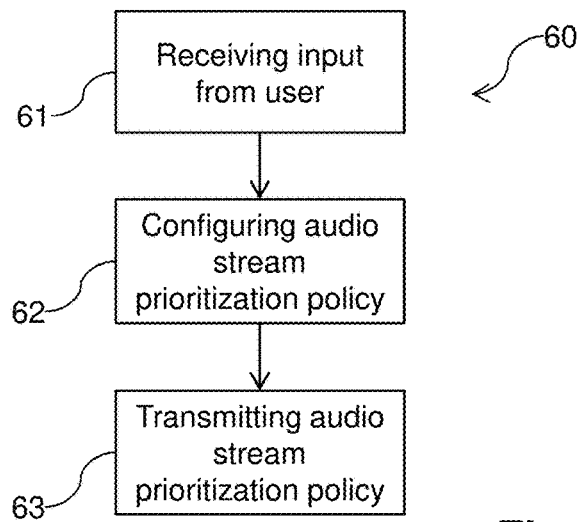
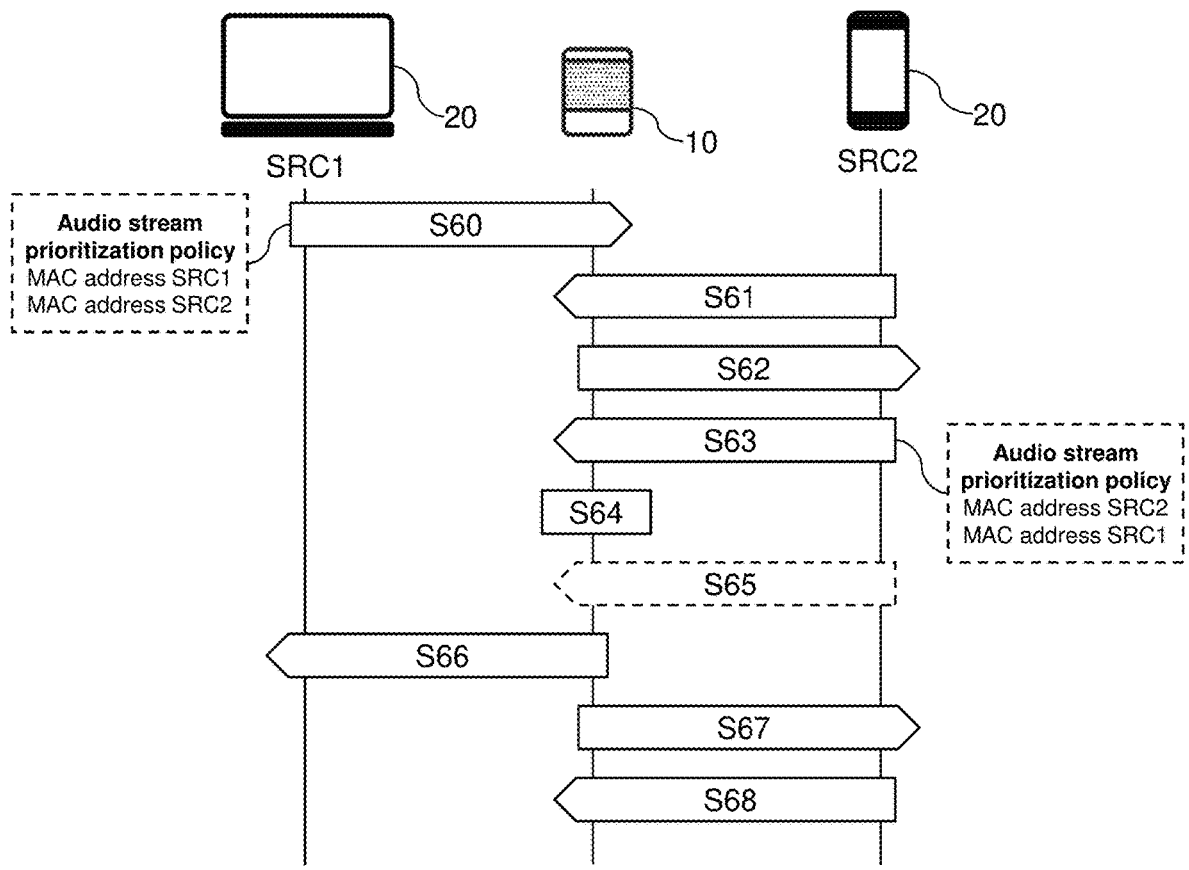

AUDIO RENDERING DEVICE AND AUDIO CONFIGURATOR DEVICE FOR AUDIO STREAM SELECTION, AND RELATED METHODS

CROSS REFERENCE TO RELATED APPLICATIONS

This application is a divisional of U.S. patent application Ser. No. 17/148,348, filed Jan. 13, 2021, which claims the benefit of U.S. provisional patent application No. 62/992,318, filed Mar. 20, 2020, all of which are incorporated by reference herein for all purposes.

BACKGROUND

Bluetooth audio rendering devices (i.e., earphone, loudspeaker, car entertainment system, etc.) are more and more spread into the market. One of the recent features improving the user experience is the possibility to connect a Bluetooth audio rendering device to multiple audio stream source devices, for example to a smartphone, a laptop, etc., while keeping only one active audio stream source device, and switching between them.

The use cases of this kind of feature are numerous, and include e.g.:
  a same user for the audio rendering device willing to switch the audio stream source from his smartphone to his laptop;
  different users willing to control the same audio rendering device, etc.

In existing implementations, the switching behavior has been implemented in different ways. The most basic one is to keep the first audio stream source device that started streaming as the active audio stream source device until it stops transmitting the audio stream, and then to switch to the other audio stream source device if it is transmitting an audio stream.

However, waiting for the active audio stream to be paused takes generally several seconds, because it is actually done at the application protocol level a few seconds after stopping the audio stream source device, thus introducing an undesired latency in the switching.

Some implementations have chosen to select the audio stream source device that is the last one having started an audio stream as the active audio stream source. By switching upon the start of an audio stream rather than after stopping an audio stream, the latency issue is resolved. However, this type of implementation introduces other issues. For instance, any video or audio encountered while browsing is going to interrupt an ongoing music streaming.

Another solution is known from U.S. Pat. No. 9,641,963. According to this solution, when a first audio stream source device is streaming a first audio stream to an audio rendering device, and when a second audio stream source device attempts to connect to the audio rendering device in order to stream a second audio stream, then the first audio stream source device is requested by the audio rendering device to select whether or not the second audio stream should be played instead of the first audio stream.

Hence, it is the first audio stream source device that decides to play the first audio stream or the second audio stream, and informs the audio rendering device of its decision.

A limitation of the solution proposed by patent U.S. Pat. No. 9,641,963 is that it requires compatible audio stream source devices, able to process such requests received from the audio rendering device. It cannot work properly if not all audio stream source devices are compatible, and/or it might lead to conflicting instructions for the audio rendering device. Another limitation is that patent U.S. Pat. No. 9,641,963 does not address the situation where the selected audio stream stops, especially in the case where more than two audio stream source devices are connected to the audio rendering device.

Another solution is known from patent application US2013/182798. According to this solution, the audio rendering device includes a user interface enabling the user to switch from one audio stream to another.

A limitation of this solution is that not all audio rendering devices can be provided with suitable user interface hardware means. Another limitation is that any switching from an audio stream to another requires an action from the user, which might prove cumbersome especially if there are more than two audio stream source devices connected to the audio rendering device.

SUMMARY

This disclosure relates to an audio rendering device and to an audio configurator device for enabling the audio rendering device to select an audio stream among a plurality of audio streams available for streaming.

The present disclosure aims at proposing a solution which overcomes all or part of the limitations discussed above.

In particular, the present disclosure aims at proposing a solution that enhances the user experience, compatible with existing audio stream source devices and not necessarily requiring specific hardware means on the audio rendering device for providing a user interface.

For this purpose, and according to a first aspect, the present disclosure relates to an audio rendering device comprising at least one audio rendering unit for playing audio streams, a processing circuit and a wireless communication unit for establishing wireless links, wherein said audio rendering device is configured to:
  receive, by the wireless communication unit, a remote audio stream prioritization policy comprising one or more lists of associations between audio stream attributes and priority values;
  update, by the processing circuit, a local audio stream prioritization policy based on the remote audio stream prioritization policy;
  identify, by the processing circuit, audio streams that are available via wireless links;
  retrieve, by the processing circuit, audio stream attributes of the available audio streams;
  select, by the processing circuit, an available audio stream to be played among the available audio streams, based on the updated local audio stream prioritization policy and based on the audio stream attributes of the available audio streams;
  play the selected available audio stream by the at least one audio rendering unit of the audio rendering device.

Hence, according to the present disclosure, the audio rendering device is the one selecting the audio stream that is to be played, based on a previously received and stored local audio stream prioritization policy. When it has to select an available audio stream among several audio streams available for streaming, the audio rendering device can therefore compare in an autonomous manner the audio stream attributes of the available audio streams to those mentioned in the local audio stream prioritization policy, and decide which available audio stream should be played based on the priority values associated to the audio stream attributes of the available audio streams, said priority values being retrieved from the local audio stream prioritization policy. Basically, the audio rendering device selects the available audio stream for which the one or more priority values satisfy a predetermined selection criterion. For instance, if each available audio stream comprises only one audio stream attribute and one priority value, the selection criterion may consist in selecting the available audio stream having the priority value indicating highest priority. If the selected available audio stream stops, then the audio rendering device can select automatically another available audio stream for which the one or more priority values satisfy the selection criterion, e.g., the available audio stream having the immediately lower priority value, etc. If an available audio stream for which the one or more priority values satisfy the selection criterion restarts, the audio rendering device can decide automatically to switch back to the restarted available audio stream, etc.

The local audio stream prioritization policy includes at least two audio stream attributes with respective priority values. Of course, the local audio stream prioritization policy preferably includes three or more audio stream attributes, with their respective priority values. It is noted that not all the priority values need to be different. However, the local audio stream prioritization policy has at least two different priority values associated to two different audio stream source attributes.

Also, it is emphasized that the priority values need not to be explicitly mentioned in the local audio stream prioritization policy. For instance, the priority values can be mentioned implicitly, e.g., by having the audio stream attributes ordered in the list according to their respective priority values.

It is noted that, in the context of the present disclosure, an "audio stream attribute" can e.g., refer to different types of audio stream sources.

For instance, an audio stream attribute can be an identifier of an audio stream source device. Such an identifier can be e.g., a MAC address of the audio stream source device, a device serial number of the audio stream source device, or any other suitable identifier enabling to distinguish different audio stream source devices.

According to another example, an audio stream attribute can be an identifier of a type of audio stream source device. For instance, a first type of audio stream source device can be smartphones, a second type can be personal computers, etc. In that case, it is possible to e.g., prioritize smartphones over laptops, etc. Such an identifier can be e.g., a Bluetooth class of device, if the wireless communication unit is a Bluetooth communication unit.

According to another example, an audio stream attribute can be an identifier of an audio stream content provider. For instance, a first audio stream content provider can be Spotify®, a second audio stream content provider can be Youtube®, a third specific audio stream content provider can be Facebook®, etc. In that case, it is possible to e.g., prioritize an audio stream from Spotify® over an audio stream from Youtube®, etc.

According to another example, an audio stream attribute can be an identifier of a type of audio stream contents. For instance, different types of audio stream contents may include: music streams, video streams, VoIP calls, phone calls, alarms, advertisings, etc. In that case, it is possible to e.g., prioritize alarms over phone calls, to prioritize phone calls over music streams and/or video streams, etc.

Hence, the local audio stream prioritization policy can be used to set different priority values to different audio stream attributes, which may refer to e.g., different audio stream source devices, different types of audio stream source devices, different audio stream content providers, different types of audio stream contents, etc. Of course, it is also possible to combine in the local audio stream prioritization policy different types of audio stream attributes. For instance, it is possible to prioritize alarms (e.g., fire alarms) over audio streams from a specific smartphone, which are prioritized over audio streams from Facebook®, which are prioritized over audio streams from any other smartphone, which are prioritized over audio streams from laptops, etc.

In order to configure the local audio stream prioritization policy in the audio rendering device, it is possible to use e.g., an audio configurator device connected by a wireless link to the audio rendering device. The audio configurator device configures the audio stream prioritization policy, based e.g., on user input, and transmits wirelessly the audio stream prioritization policy to the audio rendering device, where it is stored, preferably in a non-volatile memory, as all or part of the local audio stream prioritization policy of the audio rendering device.

It is only the audio rendering device and the audio configurator device that need to have specific hardware and/or software means. Hence, the audio rendering device can be used with existing audio stream source devices. It can operate with multiple audio stream source devices from different generations.

Also, since the audio rendering device selects the available audio stream to be played based on a previously stored local audio stream prioritization policy, said audio rendering device does not require specific hardware means for providing a user interface. The audio rendering device needs only to be able to connect to the audio configurator device which preferably includes a user interface.

In specific embodiments, the audio rendering device can further comprise one or more of the following features, considered either alone or in any technically possible combination.

In a specific embodiment, selecting an available audio stream to be played comprises:
  determining a priority score for each available audio stream based on the priority values associated, in the updated local audio stream prioritization policy, to the audio stream attributes of the available audio streams;
  selecting the available audio stream based on the priority scores.

Indeed, each available audio stream may comprise one or more priority values, associated respectively to one or more audio stream attributes. If an available audio stream comprises only one audio stream attribute, then the priority score of this available audio stream can be chosen equal to the priority value associated to its audio stream attribute. If an available audio stream comprises several audio stream attributes, then the priority score of this available audio stream is determined based on the priority values associated to its audio stream attributes. The audio rendering device then selects the available audio stream for which the priority score satisfies the selection criterion. For instance, the audio rendering device may select the available audio stream having the priority score indicating highest priority.

In a specific embodiment, determining a priority score for an available audio stream having at least two audio stream attributes listed in the updated local audio stream prioritization policy comprises at least one of the following:

selecting one of the respective priority values associated to the at least two audio stream attributes;

combining the respective priority values associated to the at least two audio stream attributes.

In a specific embodiment, selecting one of the respective priority values associated to the at least two audio stream attributes comprises selecting the priority value indicating highest priority.

In a specific embodiment, when two available audio streams have identical priority values indicating highest priority, selecting one available audio stream to be played among these two available audio streams comprises comparing their respective priority values indicating second highest priority.

In a specific embodiment, the at least two audio stream attributes being listed in different lists of the updated local audio stream prioritization policy, said different lists having different priority levels, selecting one of the respective priority values associated to the at least two audio stream attributes comprises selecting the priority value of the audio stream attribute of the list having the priority level indicating highest priority.

In a specific embodiment, the remote audio stream prioritization policy is received from a first audio configurator device and the audio rendering device is configured to:

transmit, by the wireless communication unit and to a second audio configurator device, the remote audio stream prioritization policy received from the first audio configurator device;

receive, by the wireless communication unit and from the second audio configurator device, feedback information regarding acceptance or rejection of the remote audio stream prioritization policy;

update the local audio stream prioritization policy based on the remote audio stream prioritization policy received from the first audio configurator device when the feedback information indicates an acceptance of said remote audio stream prioritization policy received from the first audio configurator device.

Hence, the audio rendering device may be connected to two or more audio configurator devices. In that case, in order to avoid conflicts, the audio rendering device can forward a newly received remote audio stream prioritization policy to a second audio configurator device from which it has previously received its local audio stream prioritization policy. The user of the second audio configurator device can then decide to either accept or reject the newly received remote audio stream prioritization policy. When rejecting it, the local audio stream prioritization policy is not updated, but the second audio configurator device can suggest modifications to the remote audio stream prioritization policy which may be forwarded to the first audio configurator device, etc.

In a specific embodiment, at least one audio stream attribute of at least one available audio stream is retrieved in a metadata information related to said at least one available audio stream.

In a specific embodiment, the metadata information is extracted from the audio stream content of said at least one available audio stream.

In a specific embodiment, the wireless communication unit is a Bluetooth communication unit. In that case, the reception of the remote audio stream prioritization policy is preferably performed with a Bluetooth Low Energy Generic Attribute-based profile.

In a specific embodiment, the audio rendering device is configured to determine autonomously an updated priority value of at least one audio stream attribute. For instance, the audio rendering device may determine the updated priority value based on user habits and machine learning.

In a specific embodiment, the audio rendering device is configured to, when selecting a second audio stream over a first audio stream, stop the reception of the first audio stream content before starting the reception of the second audio stream content.

In a specific embodiment, the audio rendering device is configured to, when selecting a second audio stream over a first audio stream:

start the reception of the second audio stream content before stopping the reception of the first audio stream content;

play simultaneously the first audio stream content and the second audio stream content;

stop the reception of the first audio stream content.

In a specific embodiment, the audio rendering device is configured to transmit, by the wireless communication unit and to the audio configurator device, a list of at least one audio stream attribute and/or the local audio stream prioritization policy stored by the audio rendering device, the received remote audio stream prioritization policy being based on the transmitted list and/or based on the local audio stream prioritization policy.

For instance, in order to initialize the local audio stream prioritization policy, the audio rendering device may send to the audio configurator device a list of at least two audio stream attributes of audio streams currently available to the audio rendering device, through one or two audio stream source devices having a wireless link with the audio rendering device. In that case, the audio configurator device may return to the audio rendering device the audio stream prioritization policy defined by the user for the at least two audio stream attributes mentioned in the received list.

According to another example, the audio rendering device may send recurrently its local audio stream prioritization policy to the audio configurator device, in order to prompt the user for any desired update of the local audio stream prioritization policy.

According to another example, when a new audio stream attribute (i.e., not listed in the local audio stream prioritization policy) becomes available to the audio rendering device, said audio rendering device may send, to the audio configurator device, a list containing this new audio stream attribute with its local audio stream prioritization policy. Hence, the audio configurator device can return an updated audio stream prioritization policy augmented with the new audio stream attribute and its user-defined priority value.

It should be noted that, when a new audio stream attribute becomes available to the audio rendering device, it may also, for example, determine autonomously its priority value based on the local audio stream prioritization policy (e.g., if the corresponding audio stream has at least one other audio stream attribute present in the local audio stream prioritization policy, it may re-use the priority value of said at least one other audio stream attribute, etc.). In other examples, the audio rendering device may be configured to e.g., associate any new audio stream attribute with the priority value indicating highest or lowest priority. Preferably, any update of the local audio stream prioritization policy made autonomously by the audio rendering device is sent to an audio configurator device in order to e.g., present it on the user interface.

According to a second aspect, the present disclosure relates to a method for playing an audio stream by an audio rendering device comprising at least one audio rendering unit for playing audio streams, wherein said method comprises steps of:
- receiving a remote audio stream prioritization policy comprising one or more lists of associations between audio stream attributes and priority values;
- updating a local audio stream prioritization policy based on the remote audio stream prioritization policy;
- identifying audio streams that are available via wireless links;
- retrieving audio stream attributes of the available audio streams;
- selecting an available audio stream to be played among the available audio streams, based on the updated local audio stream prioritization policy and based on the audio stream attributes of the available audio streams;
- playing the selected available audio stream by the at least one audio rendering unit of the audio rendering device.

According to a third aspect, the present disclosure relates to a computer program product comprising instructions which, when executed by an audio rendering device comprising at least one audio rendering unit, a processing circuit and a wireless communication unit for establishing wireless links, configure said audio rendering device to carry out a method according to any one of the embodiments of the invention.

According to a fourth aspect, the present disclosure relates to an audio configurator device comprising a processing circuit, a user interface and a wireless communication unit for establishing a wireless link with an audio rendering device adapted for playing audio streams, wherein said audio configurator device is configured to:
- receive, by the user interface, an input from a user;
- configure, by the processing circuit and based on the received input, an audio stream prioritization policy to be used by the audio rendering device for prioritizing different audio streams, wherein the audio stream prioritization policy includes one or more lists of associations between audio stream attributes and priority values;
- transmit, by the wireless communication unit, the audio stream prioritization policy to the audio rendering device.

In specific embodiments, the audio configurator device can further comprise one or more of the following features, considered either alone or in any technically possible combination.

In a specific embodiment, each audio stream attribute corresponds to one among the following:
- identifier of an audio stream source device;
- identifier of a type of audio stream source device;
- identifier of an audio stream content provider;
- identifier of a type of audio stream contents.

In a specific embodiment, the audio configurator device is configured to receive, by the wireless communication unit and from the audio rendering device, a list of at least one audio stream attribute and/or an audio stream prioritization policy stored by the audio rendering device, wherein the processing circuit is configured to determine the audio stream prioritization policy based on the received list and/or based on the received audio stream prioritization policy, and based on the received input information.

In a specific embodiment, the audio configurator device is configured to:
- receive, by the wireless communication unit and from the audio rendering device, a proposed audio stream prioritization policy received by said audio rendering device from another audio configurator device;
- present, by the user interface, the proposed audio stream prioritization policy to the user;
- receive, by the user interface, feedback information regarding acceptance or rejection of the proposed audio stream prioritization policy;
- transmit, by the wireless communication unit, the feedback information to the audio rendering device.

In a specific embodiment, the audio configurator device is integrated in an audio stream source device.

In a specific embodiment, the wireless communication unit is a Bluetooth communication unit. In that case, the communication with the audio rendering device is preferably performed with a BLE GATT-based profile.

In a specific embodiment, the user interface is a graphical interface and/or a vocal interface.

According to a fifth aspect, the present disclosure relates to a method for configuring, by an audio configurator device, an audio rendering device connected to the audio configurator device by a wireless link, wherein said method comprises steps of:
- receiving an input from a user via a user interface;
- configuring, based on the received input, an audio stream prioritization policy to be used by the audio rendering device for prioritizing different audio streams, wherein the audio stream prioritization policy includes one or more lists of associations between audio stream attributes and priority values;
- transmitting the audio stream prioritization policy to the audio rendering device.

According to a sixth aspect, the present disclosure relates to a computer program product comprising instructions which, when executed by an audio configurator device comprising a user interface, a processing circuit and a wireless communication unit for establishing wireless links, configure said audio configurator device to carry out a method according to any one of the embodiments of the present invention.

The invention will be better understood upon reading the following description, given as an example that is in no way limiting, and made in reference to the figures.

BRIEF DESCRIPTION OF THE DRAWINGS

FIG. 3 is a first example illustrating audio stream prioritization policies and audio stream prioritization policy-based selection in accordance with specific embodiments disclosed herein.

FIG. 4 is a second example illustrating audio stream prioritization policies and audio stream prioritization policy-based selection in accordance with specific embodiments disclosed herein.

FIG. 5 illustrates a diagram representing the main steps of an exemplary method for configuring an audio rendering device by an audio configurator device in accordance with specific embodiments disclosed herein.

FIG. 6 is a first exemplary embodiment illustrating the configuration and use of an audio stream prioritization policy by an audio rendering device in accordance with specific embodiments disclosed herein.

DETAILED DESCRIPTION

In the figures, references identical from one figure to another designate identical or analogous elements. For reasons of clarity, the elements shown are not to scale, unless explicitly stated otherwise.

Figure 1:
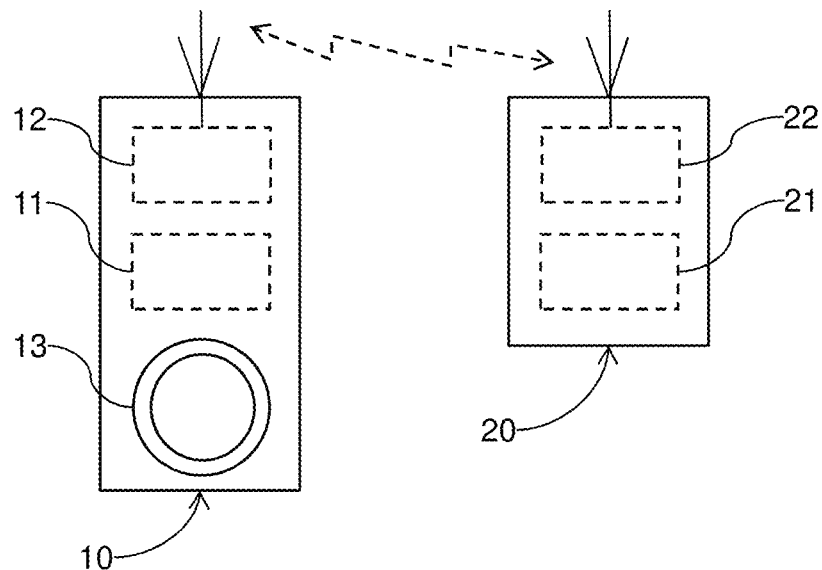
FIG. 1 illustrates a schematic representation of a system comprising an audio rendering device and an audio configurator device in accordance with specific embodiments disclosed herein.

FIG. 1 represents schematically an audio rendering device 10 and an audio configurator device 20 mutually connected by a wireless link.

The audio rendering device 10 may be e.g., a pair of true wireless earphones, a wireless speaker, a car entertainment system, etc. The audio rendering device 10 is adapted to play audio streams received from audio stream source devices (not shown in FIG. 1) via wireless links.

As illustrated by FIG. 1, the audio rendering device 10 comprises at least one audio rendering unit 13, a processing circuit 11 and a wireless communication unit 12 for establishing wireless links.

The audio rendering unit 13 may be any suitable equipment adapted to make an audio signal hearable by a user of the audio rendering device 10, and may include at least one among e.g., a loudspeaker, an earphone, etc.

For example, the processing circuit 11 comprises one or more processors and storage means (magnetic hard disk, solid-state disk, optical disk, electronic memory, etc.) in which a computer program product is stored, in the form of a set of program-code instructions to be executed in order to implement all or a part of the steps of a method 50 for playing audio streams. Alternatively, or in combination thereof, the processing circuit 11 can comprise one or more programmable logic circuits (FPGA, PLD, etc.), and/or one or more specialized integrated circuits (ASIC), and/or a set of discrete electronic components, etc., adapted for implementing all or part of said steps of the method 50 for playing audio streams.

For example, the wireless communication unit 12, coupled to the processing circuit 11, corresponds to a radiofrequency circuit comprising components (antenna(s), amplifier(s), local oscillator(s), mixer(s), analog and/or digital filter(s), etc.) considered known to the skilled person. The wireless communication unit 12 implements at least one wireless communication protocol. For instance, the wireless communication unit 12 can comprise at least one of the following:
 a Bluetooth communication unit;
 an Ultra Wide-Band (UWB) communication unit;
 a Wi-Fi communication unit;
 a ZigBee communication unit, etc.

The processing circuit 11, the wireless communication unit 12 and the audio rendering unit 13 of the audio rendering device 10 form a set of means configured by software (specific computer program product) and/or by hardware (processor, FPGA, PLD, ASIC, discrete electronic components, radiofrequency circuit, electroacoustic transducer, etc.) to implement the steps of a method 50 for playing audio streams by the audio rendering device 10.

In the following description, the wireless communication unit 12 of the audio rendering device 10 is considered, in a non-limitative manner, to be a Bluetooth communication unit. Hence, the wireless links established by the audio rendering device 10 are considered to be Bluetooth links.

In the present disclosure, an audio stream corresponds to application-level data representing an audio signal. For instance, it can be a bit stream coming from an audio streaming application, a music file stored locally read by an application, the output of an audio server, etc. The audio stream content corresponds to the useful data (vs. metadata information) representing the audio data that is actually played by the audio rendering device 10. The audio stream content can comprise one or more audio channels (e.g., mono or stereo music, etc.).

A Bluetooth audio stream refers to the Bluetooth terminology and designates the logical communication for streaming the application-level audio stream content between an audio stream source device and the audio rendering device 10. A Bluetooth audio stream uses Bluetooth packets on a single Bluetooth logical link (multiple Bluetooth audio streams can use the same logical link).

In the present disclosure, a wireless link between two entities means that the respective data link layers of said entities are configured and ready to exchange protocol data units using a wireless physical layer. The data link layer is the protocol layer right above the physical layer, and the wireless link may use either a connected mode or a connectionless mode to exchange protocol data units between said entities.

Also, in the sequel, an audio stream is referred to as "active" when the audio stream content is transmitted over the air from the audio stream source device to the audio rendering device 10, and the audio rendering device 10 processes the wireless signals received to extract the audio stream content transmitted by the audio stream source device. An audio stream is referred to as "inactive" when no audio stream content is transmitted over the air or when the audio stream content is transmitted over the air but is not extracted by the audio rendering device 10 from the wireless signals received.

Figure 2:
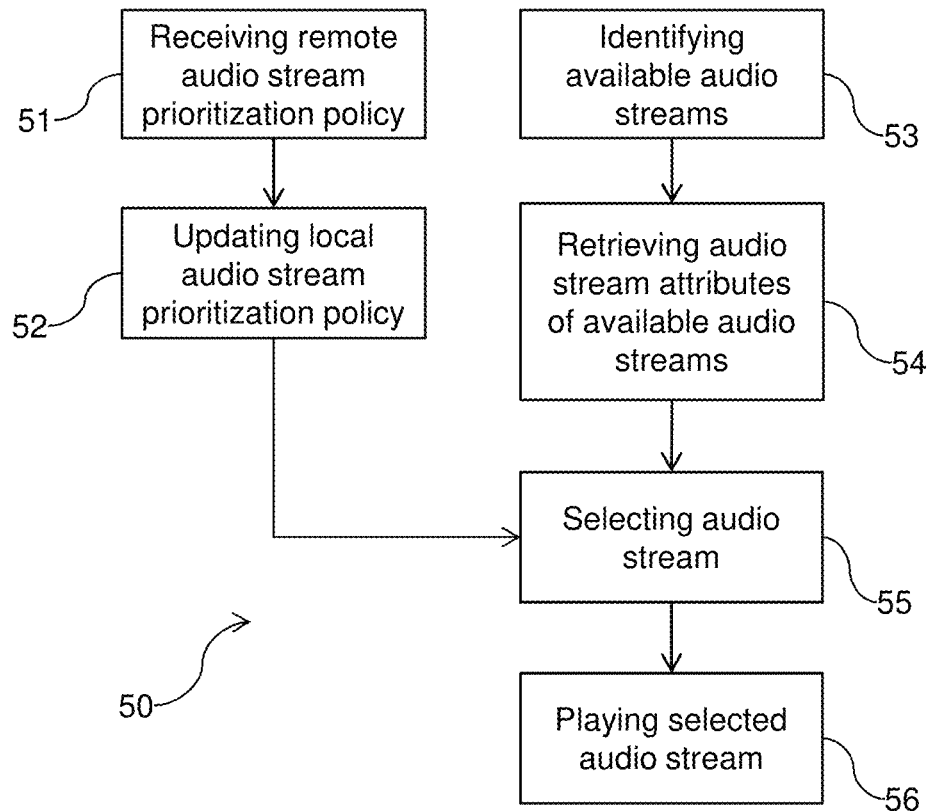
FIG. 2 illustrates a diagram representing the main steps of an exemplary method for playing audio streams by an audio rendering device in accordance with specific embodiments disclosed herein.

FIG. 2 represents schematically the main steps of an exemplary embodiment of a method 50 for playing audio streams, said steps being carried out by the audio rendering device 10.

As illustrated by FIG. 2, said method 50 for playing audio streams comprises a step 51 of receiving a remote audio stream prioritization policy from the audio configurator device 20.

The remote audio stream prioritization policy includes one or more lists of associations between audio stream attributes and priority values, that can be used by the audio rendering device 10 to prioritize available audio streams. The remote audio stream prioritization policy includes at least two different audio stream attributes, with their respective priority values. As discussed above, the priority values may be indicated explicitly or implicitly in the remote audio stream prioritization policy.

Preferably, each audio stream attribute listed in the remote audio stream prioritization policy corresponds to at least one among the following:
- identifier of an audio stream source device (e.g., a specific smartphone, a specific personal computer, etc.);
- identifier of a type of audio stream source devices (e.g., smartphones, personal computers, TVs, voice assistants, etc.);
- identifier of an audio stream content provider (e.g., Spotify®, Youtube®, Facebook®, etc.);
- identifier of a type of audio stream contents (e.g., alarms, VoIP calls, phone calls, music streams, video streams, etc.), etc.

Part a) of FIG. 3 represents an example of a remote audio stream prioritization policy comprising a single list of associations. As illustrated by part a) of FIG. 3, the single list comprises audio stream attributes of different types, and includes identifiers of audio stream devices (audio stream attributes: MAC addresses referred to as "MAC1" and "MAC2"), identifiers of audio streams content types (audio stream attributes: phone call and music streaming) and identifiers of audio stream content providers (audio stream attributes: Youtube® and) Spotify®. Each audio stream attribute in the single list has a respective priority value that is indicated explicitly in the single list. It should be noted that, in this example, a priority value equal to 1 indicates that the corresponding audio stream attribute (phone call) is the audio stream attribute having the highest priority. A priority value equal to 6 indicates that the corresponding audio stream attribute (MAC2) is the audio stream attribute having the lowest priority.

Part a) of FIG. 4 represents an example of a remote audio stream prioritization policy comprising multiple lists of associations. As illustrated by part a) of FIG. 4, the remote audio stream prioritization policy comprises four lists of associations. In this non-limiting example, each list of associations relates to a specific type of audio stream attribute, and the remote audio stream prioritization policy comprises:
- a list of associations for identifiers of audio stream content types (phone call and music streaming);
- a list of associations for identifiers of audio stream source device types (smartphone and laptop);
- a list of associations for identifiers of audio stream content providers (Spotify®, Youtube® and) Facebook®;
- a list of associations for identifiers of audio stream source devices (MAC1, MAC2 and MAC3).

Each audio stream attribute in each list has a respective priority value that is indicated explicitly. In this example, in each list, the audio stream attribute having the lowest priority value corresponds to the audio stream attribute having the highest priority in the list, and vice versa.

It should be noted that it is also possible, in some embodiments, to set different priority levels to different lists of associations of the remote audio stream prioritization policy, in order to e.g., further differentiate priority values retrieved from different lists of associations. In that case, and as discussed for the priority values, the priority levels may be explicitly mentioned in the remote audio stream prioritization policy, or implicitly mentioned, e.g., by having the lists of associations ordered in the remote audio stream prioritization policy according to their respective priority levels.

The method 50 for playing audio streams comprises also a step 52 of updating, by the processing circuit 11, a stored local audio stream prioritization policy based on the remote audio stream prioritization policy received from the audio configurator device 20.

Indeed, the audio rendering device 10 stores a local audio stream prioritization policy in a memory, preferably non-volatile, of the processing circuit 11. This local audio stream prioritization policy corresponds for instance to an audio stream prioritization policy preconfigured by the manufacturer of the audio rendering device 10, or configured upon initialization of the audio rendering device 10 by a user, or previously received from the same audio configurator device 20 or a different one.

Hence, during step 52, the newly received remote audio stream prioritization policy can be used to replace all or part of the previously stored local audio stream prioritization policy, thereby updating the local audio stream prioritization policy applied by the audio rendering device 10.

The method 50 for playing audio streams comprises also a step 53 of identifying, by the processing circuit 11, audio streams that are available via wireless links. An audio stream is referred to as "available" when the corresponding audio stream source device has a wireless link with the wireless communication unit 12 of the audio rendering device 10, and has audio stream content available for transmission over its wireless link with the audio rendering device 10. For instance, the audio rendering device 10 may monitor the list of available connected Audio/Video Distribution Transport Protocol, AVDTP, links and their respective statuses.

Also, the method 50 for playing audio streams comprises a step 54 of retrieving, by the processing circuit 11, audio streams attributes of the available audio streams. Basically, the processing circuit 11 retrieves at least one audio stream attribute per available audio stream.

When there are multiple audio streams available for streaming, for instance from one or several audio stream source devices connected to the audio rendering device 10, then the audio rendering device 10 uses its local audio stream prioritization policy to prioritize audio streams during a selection step 55. Hence, the audio rendering device 10 can compare the audio stream attributes of the available audio streams to the audio stream attributes included in its local audio stream prioritization policy to retrieve the corresponding priority values of the available audio streams. Based on the priority values retrieved, the processing circuit 11 may identify and select the available audio stream for which the one or more priority values satisfy a predetermined selection criterion.

Basically, if each available audio stream comprises only a single audio stream attribute listed in the local audio stream prioritization policy, then it is possible to e.g., compare directly the associated priority values to select the available audio stream having the audio stream attribute associated to the priority value indicating highest priority.

According to another example, if each available audio stream comprises only a single audio stream attribute listed in the local audio stream prioritization policy but in different lists of associations of the local audio stream prioritization policy, and if different priority levels are defined for the different lists of associations, then it is possible to retrieve and use also the priority levels when selecting an available audio stream. For instance, if two audio stream attributes have identical priority values, it is possible to select the available audio stream having the priority level indicating highest priority, etc.

When several audio stream attributes are retrieved for at least one available audio stream, then it is possible to determine a priority score for each available audio stream based on the priority values retrieved. Then, selection of an available audio stream is based on the priority scores.

For instance, determining a priority score for an available audio stream having at least two audio stream attributes listed in the local audio stream prioritization policy may consist in selecting as the priority score one of the retrieved priority values. Preferably, the selected priority value is the one indicating highest priority among the retrieved priority values.

If the at least two audio stream attributes are listed in different lists of associations of the local audio stream prioritization policy, said different lists having different priority levels, then selecting one of the retrieved priority values may comprise selecting the priority value of the audio stream attribute of the list of associations having the priority level indicating highest priority.

When the selected priority values of two available audio streams are identical, it is possible, for instance, to compare their respective priority values indicating second highest priority, etc.

Part b) of FIG. 3 illustrates the selection of an available audio stream, based on the local audio stream prioritization policy represented in part a) of FIG. 3. In part b) of FIG. 3, there are two available audio streams:
- a first available audio stream for which the retrieved audio stream attributes are: MAC1, smartphone and phone call;
- a second available audio stream for which the retrieved audio stream attributes are: MAC2, laptop, music streaming and Spotify®.

First it should be noted that the local audio stream prioritization policy (part a) of FIG. 3) does not include the audio stream attributes smartphone and laptop, such that no priority value is retrieved for these audio stream attributes.

For the first available audio stream, the priority value of the audio stream attribute MAC1 is equal to 5 and the priority value of the audio stream attribute phone call is equal to 1. Since the priority value of 1 indicates a higher priority than the priority value of 5, the priority score is selected to be equal to 1, i.e. the priority value of the audio stream attribute phone call.

For the second available audio stream, the priority value of the audio stream attribute MAC2 is equal to 6, the priority value of the audio stream attribute music streaming is equal to 2 and the priority value of the audio stream attribute Spotify® is equal to 4. The priority score is selected to be equal to 2, i.e., the priority value of the audio stream attribute music streaming.

In the example of part b) of FIG. 3, the selected available stream is the first available audio stream, since the priority score of 1 indicates a higher priority than the priority score of 2.

Part c) of FIG. 3 illustrates another example of the selection of an available audio stream among two available audio streams, based on the local audio stream prioritization policy represented in part a) of FIG. 3:
- a first available audio stream for which the retrieved audio stream attributes are: MAC1, smartphone and phone call;
- a second available audio stream for which the retrieved audio stream attributes are: MAC2, laptop and phone call.

For the first available audio stream, the priority value of the audio stream attribute MAC1 is equal to 5 and the priority value of the audio stream attribute phone call is equal to 1. Hence, the priority score is initially set to 1.

For the second available audio stream, the priority value of the audio stream attribute MAC2 is equal to 6 and the priority value of the audio stream attribute phone call is equal to 1. Hence, the priority score is initially set to 1.

Since the priority scores of the first and second available audio streams are initially identical (both equal to 1), the priority scores are set to the priority values indicating second highest priority.

For the first audio stream, the priority value indicating second highest priority is the priority value of 5 associated to the audio stream attribute MAC1, such that the priority score is set to 5.

For the second audio stream, the priority value indicating second highest priority is the priority value of 6 associated to the audio stream attribute MAC2, such that the priority score is set to 6.

In the example of part c) of FIG. 3, the selected available stream is the first available audio stream, since the priority score of 5 indicates a higher priority than the priority score of 6.

Part b) of FIG. 4 illustrates the selection of an available audio stream, based on the local audio stream prioritization policy represented in part a) of FIG. 4. In part b) of FIG. 4, there are two available audio streams:
- a first available audio stream for which the retrieved audio stream attributes are: MAC1, smartphone and phone call;
- a second available audio stream for which the retrieved audio stream attributes are: MAC2, laptop, music streaming and Spotify®.

For the first available audio stream, the priority value of the audio stream attribute MAC1 is equal to 3, the priority value of the audio stream attribute smartphone is equal to 1 and the priority value of the audio stream attribute phone call is equal to 1. Since the priority value of 1 indicates a higher priority than the priority value of 3, the priority score is initially selected to be equal to 1.

For the second available audio stream, the priority value of the audio stream attribute MAC2 is equal to 1, the priority value of the audio stream attribute laptop is equal to 2, the priority value of the audio stream attribute music streaming is equal to 2 and the priority value of the audio stream attribute Spotify® is equal to 2. The priority score is initially selected to be equal to 1.

Since the priority scores of the first and second available audio streams are initially identical (both equal to 1), the priority scores are set to the priority values indicating second highest priority.

For the first audio stream, three different audio stream attributes have a priority value of 1, such that the priority value indicating second highest priority is also the priority value of 1, and the priority score is set to 1.

For the second audio stream, the priority value indicating second highest priority is the priority value of 2, such that the priority score is set to 2.

In the example of part b) of FIG. 4, the selected available stream is the first available audio stream, since the priority score of 1 indicates a higher priority than the priority score of 2.

Part c) of FIG. 4 illustrates the selection of an available audio stream, based on the local audio stream prioritization policy represented in part a) of FIG. 4. Part c) of FIG. 4 further illustrates the case where different priority levels are associated to the different lists of associations, and it is assumed that:

the list of associations for identifiers of audio stream content types (phone call and music streaming) has a priority level of 1 (indicating highest priority in this example);

the list of associations for identifiers of audio stream source devices (MAC1, MAC2 and MAC3) has a priority level of 2;

the list of associations for identifiers of audio stream content providers (Spotify®, Youtube® and Facebook®) has a priority level of 3;

the list of associations for identifiers of audio stream source device types (smartphone and laptop) has a priority level of 4 (indicating lowest priority in this example).

In part c) of FIG. 4, there are two available audio streams:

a first available audio stream for which the retrieved audio stream attributes are: phone call, MAC1 and smartphone;

a second available audio stream for which the retrieved audio stream attributes are: music streaming, MAC2, Spotify® and laptop.

The list of associations having the priority level indicating highest priority corresponds to the list of associations for identifiers of audio stream content types (phone call and music streaming).

For the first available audio stream, the audio stream attribute identifying the audio stream content type is set to phone call, and the associated priority value is equal to 1. The priority score is set to 1.

For the second available audio stream, the audio stream attribute identifying the audio stream content type is set to music streaming, and the associated priority value is equal to 2. The priority score is set to 2.

In the example of part c) of FIG. 4, the selected available stream is the first available audio stream, since the priority score of 1 indicates a higher priority than the priority score of 2.

Part d) of FIG. 4 illustrates the selection of an available audio stream, based on the local audio stream prioritization policy represented in part a) of FIG. 4, and using the same priority levels as defined for part c) of FIG. 4. In part d) of FIG. 4, there are two available audio streams:

a first available audio stream for which the retrieved audio stream attributes are: music streaming, MAC1 and smartphone;

a second available audio stream for which the retrieved audio stream attributes are: music streaming, MAC2, Spotify® and laptop.

The list of associations having the priority level indicating highest priority corresponds to the list of associations for identifiers of audio stream content types (phone call and music streaming).

For the first available audio stream, the audio stream attribute identifying the audio stream content type is set to music streaming, and the associated priority value is equal to 2. The priority score is initially set to 2.

For the second available audio stream, the audio stream attribute identifying the audio stream content type is set to music streaming, and the priority score is initially set to 2.

Since the priority scores of the first and second available audio streams are initially identical (both equal to 2), the priority scores are updated by considering the list of associations having the priority level indicating second highest priority, which corresponds to the list of associations for identifiers of audio stream source devices (MAC1, MAC2 and MAC3).

For the first available audio stream, the audio stream attribute identifying the audio stream source device is set to MAC1, and the associated priority value is equal to 3. The priority score is set to 3.

For the second available audio stream, the audio stream attribute identifying the audio stream source device is set to MAC2, and the associated priority value is equal to 1. The priority score is set to 1.

In the example of part d) of FIG. 4, the selected available stream is the second available audio stream, since the priority score of 1 indicates a higher priority than the priority score of 3.

According to other examples, determining a priority score for an available audio stream having at least two audio stream attributes listed in the local audio stream prioritization policy may comprise combining the priority values retrieved from the local audio stream prioritization policy. For instance, it is possible to compute the priority score as the mean value of the retrieved priority values, or as a weighted sum of said retrieved priority values, etc. When the priority values are retrieved from different lists of associations having different respective priority levels, then the priority score may be computed as a weighted sum of the retrieved priority values, wherein the weighting coefficients depend on the priority levels of the different priority values, etc.

The selected available audio stream is then played by the audio rendering unit 13 of the audio rendering device 10, during a playing step 56.

The audio rendering device 10 can detect later on that the selected audio stream has become no longer available, for instance because the audio stream source device has no more audio stream content to transmit to the audio rendering device 10 and/or because the audio stream source device has been disconnected from the audio rendering device 10. In that case, the audio rendering device 10 can select automatically another audio stream among the available audio streams by using its local audio stream prioritization policy, without user intervention. For instance, if a phone call had been selected over music streaming, then the audio rendering device 10 can return to the music streaming once the phone call has stopped.

As illustrated in FIG. 1, the audio configurator device 20 comprises a processing circuit 21 and a wireless communication unit 22.

For example, the processing circuit 21 comprises one or more processors and storage means (magnetic hard disk, solid-state disk, optical disk, electronic memory, etc.) in which a computer program product is stored, in the form of a set of program-code instructions to be executed in order to implement all or a part of the steps of a method 60 for configuring the audio rendering device 10. Alternatively, or in combination thereof, the processing circuit 21 can comprise one or more programmable logic circuits (FPGA, PLD, etc.), and/or one or more specialized integrated circuits (ASIC), and/or a set of discrete electronic components, etc., adapted for implementing all or part of said steps.

For example, the wireless communication unit 22, coupled to the processing circuit 21, corresponds to a radiofrequency circuit comprising components (antenna(s), amplifier(s), local oscillator(s), mixer(s), analog and/or digital filter(s), etc.) considered known to the skilled person. As discussed above, the wireless communication unit 22 implements at least one wireless communication protocol. In the non-limitative example considered herein, the wireless communication unit 22 is a Bluetooth communication unit.

The audio configurator device 20 comprises also a user interface 23 (not represented FIG. 1) adapted for interacting with a user, i.e., adapted for receiving inputs from said user, and for presenting outputs to said user. For instance, the user interface 23 can comprise a graphical interface (touchscreen, screen, projector, keyboard, mouse, etc.) and/or a vocal interface (microphone, speech recognition capabilities, etc.).

In other words, the processing circuit 21, the wireless communication unit 22 and the user interface 23 of the audio configurator device 20 form a set of means configured by software (specific computer program product) and/or by hardware (processor, FPGA, PLD, ASIC, discrete electronic components, radiofrequency circuit, etc.) to implement all or part of the steps of a method 60 for configuring the audio rendering device 10.

It should be noted that the audio configurator device 20 may be integrated in an audio stream source device, in which case it can both configure the audio rendering device 10 and transmit audio streams to the audio rendering device 10. However, the audio configurator device 20 is not necessarily integrated with an audio stream source device, and may for instance, in some embodiments, consist in a remote control dedicated to the configuration of the audio rendering device 10.

FIG. 5 represents schematically the main steps of an exemplary embodiment of a method 60 for configuring an audio rendering device 10 by an audio configurator device 20. As illustrated by FIG. 5, said method 60 for configuring the audio rendering device 10 comprises the following steps, executed by the audio configurator device 20:
  a step 61 of receiving an input from a user;
  a step 62 of configuring, based on the received input, an audio stream prioritization policy to be used by the audio rendering device 10 for prioritizing different audio streams;
  a step 63 of transmitting the audio stream prioritization policy to the audio rendering device 10.

During step 61, the user interface 23 receives an input from the user regarding the respective priority values that should be associated to different audio stream attributes. This step 61, which can resume to collecting the user's input for configuring the audio stream prioritization policy, can be implemented in various ways, and any specific implementation is considered within the scope of the present disclosure.

For instance, the user can provide directly all the required information, i.e., both the audio stream attributes and the respective priority values. Alternatively or in combination, the user interface 23 can present to the user a list of audio stream attributes, which can correspond e.g. to a list of audio stream source devices paired with or likely to be paired with the audio rendering device 10. Based on the presented list, the user can provide the corresponding desired priority values, etc.

In some embodiments, the audio configurator device 20 may receive, from the audio rendering device 10, a list of at least one audio stream attribute and/or the local audio stream prioritization policy stored by the audio rendering device 10. In that case, the audio configurator device 20 configures the audio stream prioritization policy based on the user's input, but also based on the received list and/or based on the local audio stream prioritization policy received from the audio rendering device 10. For instance, the received list and/or the received local audio stream prioritization policy may be presented to the user before receiving the user's input. Whether or not the audio configurator device 20 receives from the audio rendering device 10 a list of at least one audio stream attribute and/or the local audio stream prioritization policy stored by the audio rendering device 10 might depend on the elected implementation and/or on a configuration phase. For instance, if the configuration phase corresponds to the first configuration of the audio rendering device 10 (i.e., initialization), then the audio stream prioritization policy might be configured only by using the user's input or it can use also a received list of audio stream attributes associated to available audio streams. Subsequently, the audio configurator device 20 might receive, on a regular basis and/or when the audio rendering device 10 is switched ON, the local audio stream prioritization policy of the audio rendering device 10 in order to prompt the user for any required modification. Also, the audio configurator device 20 may receive both a list of at least one audio stream attribute and the local audio stream prioritization policy of the audio rendering device 10 when e.g., a new audio stream attribute becomes available.

In some embodiments, the audio rendering device 10 may also be configured to determine autonomously updated priority values of audio stream attributes. For instance, the audio rendering device 10 may determine an updated priority value based on user habits and machine learning.

Based on the user's input, the audio configurator device 20 can configure the audio stream prioritization policy during step 62.

Figure 10:
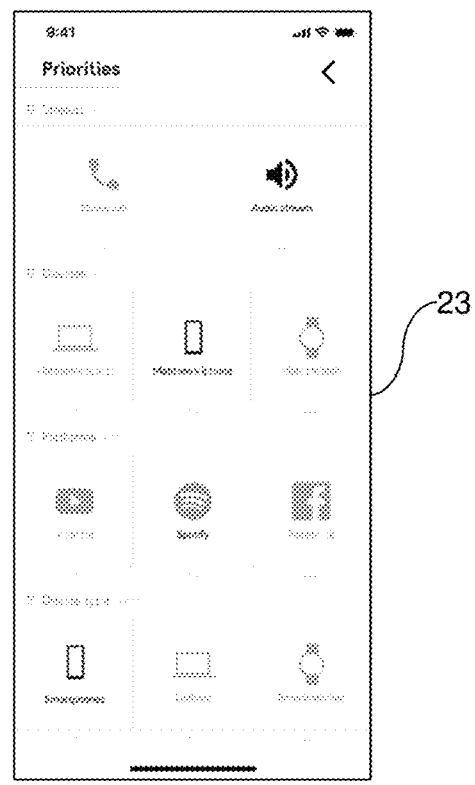
FIG. 10 illustrates an example of a user interface of an audio configurator device, presenting an audio stream prioritization policy, in accordance with specific embodiments disclosed herein.

FIG. 10 represents schematically a non-limitative example of a user interface 23 of an audio configurator device 20 presenting an exemplary audio stream prioritization policy to the user.

In the example illustrated by FIG. 10, the audio stream prioritization policy comprises several lists of associations ordered by their respective priority levels, a list of associations towards the top of the user interface 23 having a higher priority than a list of associations towards the bottom of said user interface 23, and vice versa. As illustrated by FIG. 10, the audio stream prioritization policy comprises four such lists of associations:
  a list of associations for identifiers of audio stream content types (referred to as "streams" in FIG. 10);
  a list of associations for identifiers of audio stream source devices (referred to as "devices" in FIG. 10);
  a list of associations for identifiers of audio stream content providers (referred to as "platforms" in FIG. 10);
  a list of associations for identifiers of audio stream source device types (referred to as "device type" in FIG. 10).

For each list of associations, the user interface 23 shows several audio stream attributes ordered according to their respective priority values, an audio stream attribute towards the left of the user interface 23 having a higher priority than an audio stream attribute towards the right of said user interface 23, and vice versa. For instance, the audio stream attribute phone call has a higher priority than the audio stream attribute audio stream, the audio stream attribute smartphones has a higher priority than the audio stream attribute laptops, which has a higher priority than the audio stream attribute smartwatches, etc.

The audio stream prioritization policy is then transmitted, during step 63, to the audio rendering device 10. This transmitted audio stream prioritization policy, configured and transmitted by the audio configurator device 20, is received by the audio rendering device 10 as a remote audio stream prioritization policy, and is used by the audio rendering device 10 to update its local audio stream prioritization policy. Preferably, the communication between the audio configurator device 20 and the audio rendering device 10, when based on a version 4.0 or later of the Bluetooth protocol, is performed with a Bluetooth Low Energy Generic Attribute-based profile. However, other profiles and other wireless communication protocols can also be used in other embodiments.

FIGS. 6 to 9 represent exemplary embodiments showing how an audio stream prioritization policy can be configured and used.

In these figures, two different audio stream source devices are considered, respectively referred to as SRC1 and SRC2. Of course, a different number of audio stream source devices can be considered. Also, in these figures, each audio stream source device SRC1, SRC2 is also an audio configurator device 20. Of course, the present disclosure can be used with a single audio configurator device 20, which is not necessarily integrated in an audio stream source device, as discussed above.

In the example illustrated by FIG. 6, the audio stream source device SRC1 is a laptop, the audio stream source device SRC2 is a smartphone, and the audio rendering device 10 is a loudspeaker. In FIG. 6, the audio stream attributes of the audio stream prioritization policy are assumed in a non-limitative manner to correspond to the respective MAC addresses of the audio stream source devices SRC1, SRC2.

In FIG. 6, the local audio stream prioritization policy initially prioritizes audio streams from the audio stream source device SRC1 over audio streams from the audio stream source device SRC2. The local audio stream prioritization policy may consist, for instance, in an ordered single list comprising first the MAC address of the audio stream source device SRC1, and comprising second the MAC address of the audio stream source device SRC2.

Initially, a first audio stream from the audio stream source device SRC1 is active, and a first audio stream content is transmitted from the audio stream source device SRC1 to the audio rendering device 10 (reference S60). Then, the audio stream source device SRC2 sends to the audio rendering device 10 a request for transmitting a second audio stream (reference S61). Based on its local audio stream prioritization policy, the audio rendering device 10 rejects this request (reference S62). Then, the audio stream source device SRC2 configures a new audio stream prioritization policy (e.g., based on user input) and transmits it to the audio rendering device 10 (reference S63). The audio rendering device 10 then updates its local audio stream prioritization policy based on the new (remote) audio prioritization policy received from the audio stream source device SRC2 (reference S64). Then, the audio stream source device SRC2 resends to the audio rendering device 10 a request for transmitting the second audio stream (reference S65). Based on its updated local audio stream prioritization policy, the audio rendering device 10 accepts this request and requests the audio stream source device SRC1 to stop transmitting the first audio stream content (reference S66), such that the audio rendering device 10 stops the reception of the first audio stream content. Then, the audio rendering device 10 notifies its acceptance to the audio stream source device SRC2 (reference S67). The second audio stream becomes active, and the audio stream source device SRC2 starts transmitting the second audio stream content (reference S68), thereby switching the audio rendering device 10 to the second audio stream.

It should be noted that the Bluetooth audio stream for exchanging the second (application-level) audio stream content between the audio stream source device SRC2 and the audio rendering device 10 may be established before deciding to switch to this second audio stream (for instance during step S63 or S65). A Bluetooth audio stream is referred to as "established" if both the audio stream source device and the audio rendering device 10 are ready to respectively transmit and receive the corresponding (application-level) audio stream content. Alternatively, the Bluetooth audio stream for exchanging the second (application-level) audio stream content between the audio stream source device SRC2 and the audio rendering device 10 may be established only after the audio rendering device 10 selects the second audio stream over the first audio stream. In that case, signaling for establishing said Bluetooth audio stream still needs to be exchanged before being able to transmit and receive the second audio stream content (for instance during step S67).

It should also be noted that, in FIG. 6, the audio stream source device SRC2 does not necessarily have to resend to the audio rendering device 10 a request for transmitting the second audio stream (reference S65). For instance, if the second audio stream is still available when updating the local audio stream prioritization policy (reference S64), then the audio rendering device 10 can automatically switch to the second audio stream by requesting the audio stream source device SRC1 to stop transmitting the first audio stream (reference S66), and by notifying its acceptance of the second audio stream to the audio stream source device SRC2 (reference S67).

As illustrated by FIG. 6, a plurality of audio configurator devices 20 may be connected simultaneously to the audio rendering device 10. If these audio configurator devices 20 are assumed to belong to a same user, then the new (remote) audio stream prioritization policy received from one of the audio configurator devices 20 may be used directly to update the local audio stream prioritization policy of the audio rendering device 10. However, if the audio configurator devices 20 belong to different users, then the behavior described with reference to FIG. 6 might not be optimal since it might result in uncontrolled updates of the local audio stream prioritization policy of the audio rendering device 10.

Figure 7:
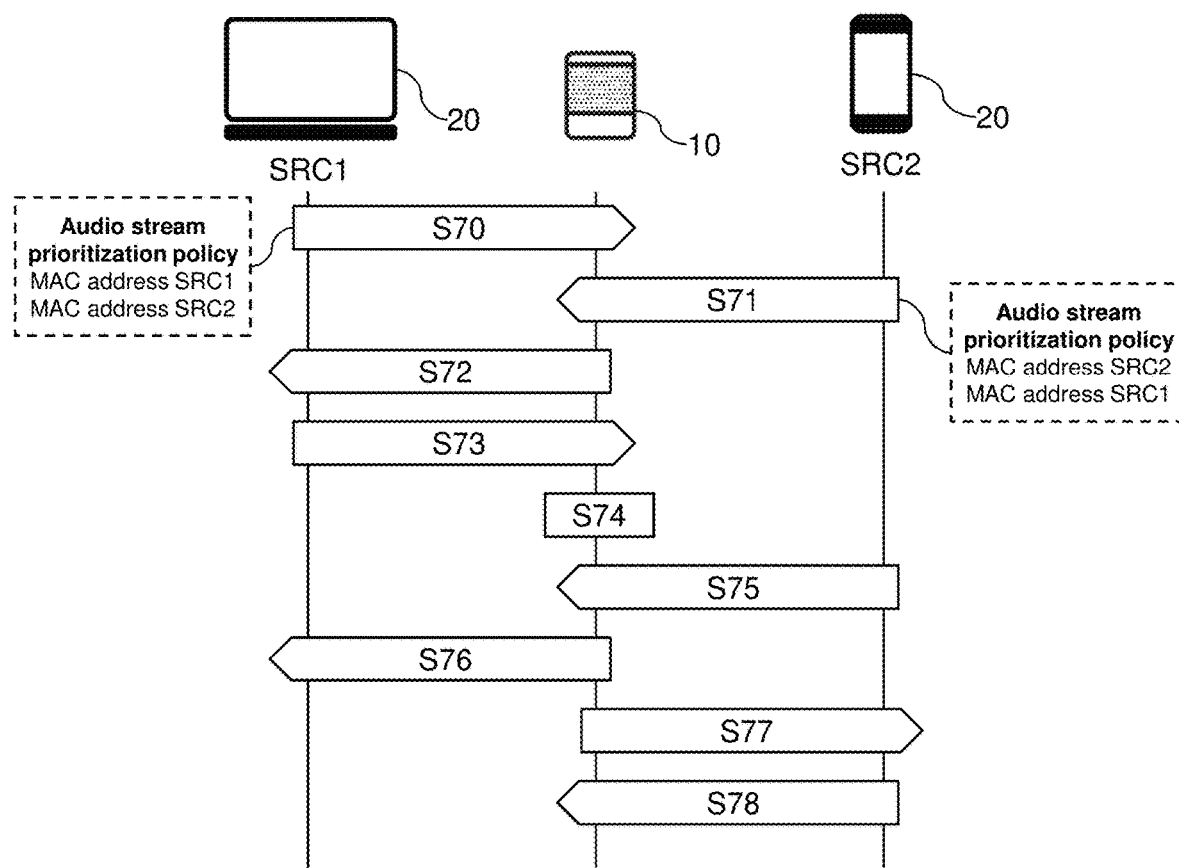
FIG. 7 is a second exemplary embodiment illustrating the configuration and use of an audio stream prioritization policy by an audio rendering device in accordance with specific embodiments disclosed herein.

FIG. 7 illustrates a specific embodiment for the case where different audio configurator devices 20 belong to different users.

As illustrated by FIG. 7, the local audio stream prioritization policy consists in a single list which initially prioritizes audio streams from the audio stream source device SRC1 over audio streams from the audio stream source device SRC2. Also, a first audio stream is transmitted from the audio stream source device SRC1 to the audio rendering device 10 (reference S70). Then, the audio stream source device SRC2 sends to the audio rendering device 10 a proposed audio stream prioritization policy (reference S71). Rather than updating directly its local audio prioritization policy, the audio rendering device 10 sends the proposed audio stream prioritization policy to the audio stream source device SRC1 (reference S72). The audio stream source device SRC1 may then present the proposed audio stream prioritization policy to its user, via the user interface 23. The audio stream source device SRC1 then receives feedback information from the user, regarding acceptance or rejection of the proposed audio stream prioritization policy, and forwards this feedback information to the audio rendering device 10 (reference S73). In the example illustrated by FIG. 7, the feedback information indicates an acceptance of the proposed audio stream prioritization policy and the audio rendering device 10 updates its local audio stream prioritization policy (reference S74). Then, the audio stream source device SRC2 sends to the audio rendering device 10 a request for transmitting a second audio stream (reference S75). Based on its updated local audio stream prioritization policy, the audio rendering device 10 accepts this request and requests the audio stream source device SRC1 to stop transmitting the first audio stream content (reference S76), such that the audio rendering device 10 stops the reception of the first audio stream content. Then, the audio rendering device 10 notifies its acceptance to the audio stream source device SRC2 (reference S77). The second audio stream becomes active, and the audio stream source device SRC2 starts transmitting the second audio stream content (reference S78), thereby switching the audio rendering device 10 to the second audio stream.

As indicated above, an audio stream attribute can e.g., refer to different types of audio stream sources.

For instance, an audio stream attribute may correspond to an identifier of an audio stream source device or of a type of audio stream source devices. Such audio stream attributes can be easily retrieved when the audio rendering device 10 is paired to an audio stream source device, by using signaling exchanged during pairing such as the MAC address or the Bluetooth device class of the audio stream source device.

An audio stream attribute can also be e.g., an identifier of an audio stream source content provider (Spotify®, Youtube®, Facebook®, etc.) or of a type of audio stream content (alarm, phone call, music streaming, video streaming, etc.). In that case, it might be convenient to use audio stream signaling, referred to as "metadata information", in order to enable the audio rendering device 10 to retrieve such audio stream attributes from the available audio streams. This metadata information, exchanged between the audio stream source devices and the audio rendering device 10, may be e.g., transmitted separately from the audio stream content, or embedded directly in the audio stream content by using audio watermarking techniques. An advantage of including the metadata information directly in the audio stream content is that it can be included directly by the audio stream content provider, thereby requiring no specific hardware or software means in the audio stream source devices to support such metadata information. A drawback of including the metadata information directly in the audio stream content is that the corresponding audio stream needs to be active in order to be able to extract the metadata information, such that the audio rendering device 10 may need to have two or more audio streams active simultaneously.

Figure 8:
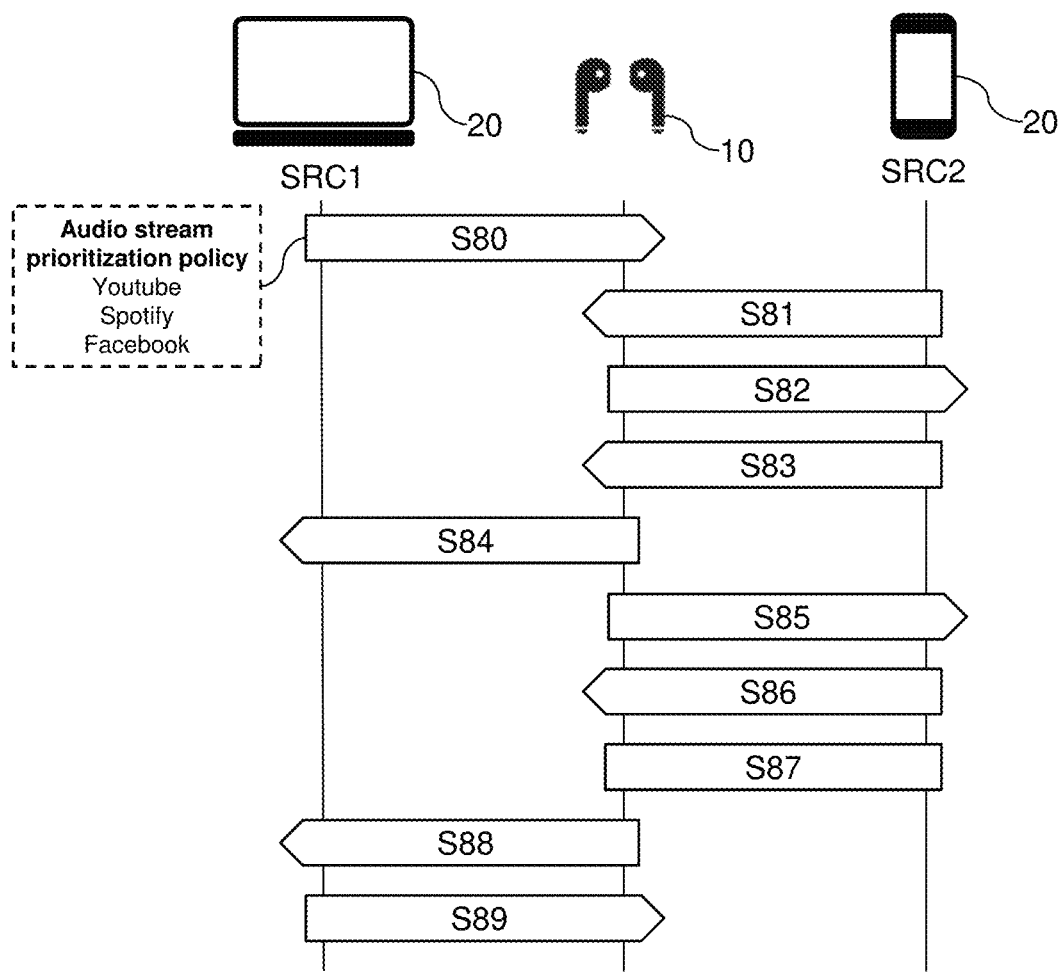
FIG. 8 is a third exemplary embodiment illustrating the configuration and use of an audio stream prioritization policy by an audio rendering device in accordance with specific embodiments disclosed herein.
Figure 9:
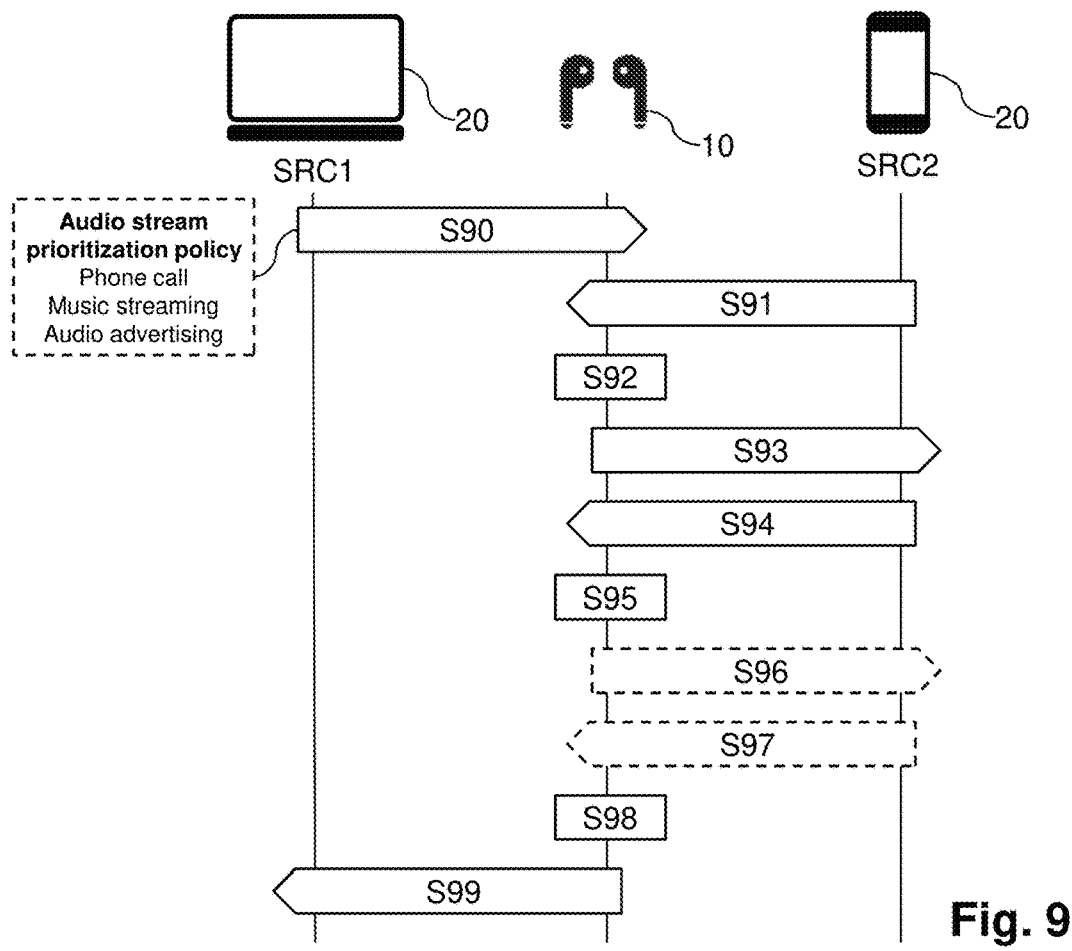
FIG. 9 is a fourth exemplary embodiment illustrating the configuration and use of an audio stream prioritization policy by an audio rendering device in accordance with specific embodiments disclosed herein.

FIGS. 8 and 9 illustrate exemplary embodiments showing how metadata information can be used by the audio rendering device 10.

In the example illustrated by FIG. 8, the audio stream source device SRC1 is a laptop, the audio stream source device SRC2 is a smartphone, and the audio rendering device 10 corresponds to earphones. In FIG. 8, the audio stream attributes of the local audio stream prioritization policy are assumed in a non-limitative manner to correspond to identifiers of the audio stream content providers, ordered by decreasing priority values as Youtube®, Spotify® and Facebook®. In FIG. 8, it is assumed that metadata information is transmitted separately from the audio stream content.

Initially, a first audio stream is active, transmitted by the audio stream source device SRC1 to the audio rendering device 10 (reference S80). The audio rendering device 10 has retrieved the metadata information for the first audio stream, indicating that it is an audio stream from Spotify®. Then, the audio stream source device SRC2 sends to the audio rendering device 10 a request for transmitting a second audio stream (reference S81), together with metadata information indicating that it is an audio stream from Facebook®. Based on its local audio stream prioritization policy, the audio rendering device 10 rejects this request (reference S82). Then, the audio stream source device SRC2 sends to the audio rendering device 10 a request for transmitting a third audio stream (reference S83), together with metadata information indicating that it is an audio stream from Youtube®. Based on its local audio stream prioritization policy, the audio rendering device 10 accepts this request and requests the audio stream source device SRC1 to stop transmitting the first audio stream content (reference S84), such that the audio rendering device 10 stops the reception of the first audio stream content. Then, the audio rendering device 10 notifies its acceptance to the audio stream source device SRC2 (reference S85). The third audio stream becomes active, and the audio stream source device SRC2 starts transmitting the third audio stream content (reference S86).

FIG. 8 also illustrates that, later on, the third audio stream stops (reference S87). In that case, if the first audio stream is still available, the audio rendering device 10 may request the audio stream source device SRC1 to restart transmitting the first audio stream content (reference S88), and the first audio stream is re-activated (reference S89).

In the example illustrated by FIG. 9, the audio stream attributes of the audio stream prioritization policy are assumed in a non-limitative manner to correspond to identifiers of the types of audio stream contents, ordered by decreasing priority values as phone call, music streaming and audio advertising. In FIG. 9, it is assumed that the metadata information is embedded in the audio stream content.

Initially, a first audio stream is active, transmitted by the audio stream source device SRC1 to the audio rendering device 10 (reference S90). The audio rendering device 10 has extracted the metadata information from the first audio stream content, indicating that it corresponds to music streaming. Then, the audio stream source device SRC2 activates a second audio stream (reference S91), and the second audio stream content is transmitted to the audio rendering device 10, with metadata information embedded therein indicating that it corresponds to audio advertising. It is emphasized that, at this stage, both the first audio stream and the second audio stream are active, although only the first audio stream is played by the audio rendering unit 13. The metadata information is extracted from the second audio stream content by the audio rendering device 10 (reference S92). Based on its local audio stream prioritization policy, the audio rendering device 10 rejects this second audio stream (reference S93), which is then deactivated. Then, the audio stream source device SRC2 activates a third audio stream (reference S94), and the third audio stream content is transmitted to the audio rendering device 10, with metadata information embedded therein indicating that it corresponds to a phone call. The metadata information is extracted from the third audio stream content by the audio rendering device 10 (reference S95). Based on its local audio stream prioritization policy, the audio rendering device 10 may notify the audio stream source device SRC2 that the third audio stream is accepted (reference S96) in order to ensure that the third audio stream remains active (reference S97). The audio rendering device 10 may stop playing the first audio stream content before playing the third audio stream content. Alternatively, and as illustrated by FIG. 9, it may play simultaneously the first and third audio stream contents, e.g., by ducking the first audio stream content with the third audio stream content (reference S98). After the ducking is completed, the audio rendering device 10 requests the audio stream source device SRC1 to stop transmitting the first audio stream content (reference S99), such that the first audio stream is deactivated.

It should be noted that it is also possible to use, as an alternative or in combination with metadata information, audio stream content processing algorithms which can process directly the audio stream content in order to estimate the audio stream content type or any other contextual information in relation with the audio stream content (e.g., type of music, type of spoken language, etc.). For instance, such algorithms may process the audio stream content to determine e.g., whether it corresponds to music or to speech (i.e., phone call), etc. Of course, the corresponding audio stream needs to be active in order to be able to process the audio stream content.

As discussed above, it is understood that the switching from a first audio stream to a second audio stream may be performed in different ways.

For instance, it is possible to have, in some embodiments, at most one active audio stream. In that case, the first audio stream needs to be deactivated before the second audio stream is activated, in a kind of "break before make" approach. Hence, the audio rendering device 10 stops the reception of the first audio stream content before starting the reception of the second audio stream content (see e.g., FIGS. 6 to 8). Such an approach is advantageous in that it may reduce the power consumption and the processing of the audio rendering device 10.

It should be noted that, in the present disclosure, stopping the reception of an audio stream means that the audio rendering device stops extracting the audio stream content from the wireless signals received from the audio stream source device. It may imply exchanging signaling between the audio stream source device and the audio rendering device 10 to ensure that the audio stream source device stops the transmission of the audio stream content to the audio rendering device 10. For instance, the audio rendering device 10 may stop the reception of audio stream content by sending an audio/video distribution transport protocol (AVDTP) suspend request to the audio stream source device which, in response, suspends the Bluetooth audio stream such that the transmission of the (application-level) audio stream content is stopped.

Also, starting the reception of an audio stream means that the audio rendering device starts extracting the audio stream content from the wireless signals received from the audio stream source device. Of course, this may imply exchanging signaling between the audio stream source device and the audio rendering device 10 to ensure that the audio stream source device starts the transmission of the audio stream content to the audio rendering device 10. For instance, the audio rendering device 10 may start the reception of audio stream content by sending an AVDTP start request to the audio stream source device (which, in response, starts the Bluetooth audio stream and starts the transmission of the application-level audio stream content), and by starting to extract the audio stream content from the received wireless signals.

In other embodiments, it is possible to have, at least intermittently, two (or more) audio streams active simultaneously. In that case, it is possible to play only one audio stream content at the time. Hence, the audio rendering device 10 stops playing the first audio stream content before starting to play the second audio stream content. The first audio stream content, still extracted by the audio rendering device 10, is e.g., trashed without being played by the audio rendering unit 13. However, it is also possible, in other embodiments, to play simultaneously the first and second audio stream contents at least intermittently, for instance by ducking the first audio stream content with the second audio stream content (see e.g., FIG. 9).

It is emphasized that the present invention is not limited to the above exemplary embodiments. Variants of the above exemplary embodiments are also within the scope of the present invention.

For instance, the exemplary embodiments have been described by focusing on the fact that the local audio stream prioritization policy is configured by an audio configurator device 20 connected to the audio rendering device 10 by a wireless link. However, in other embodiments, the local audio stream prioritization policy may be preconfigured by the manufacturer of the audio rendering device 10, and/or it might be configurable by an audio configurator device 20 that is connected to the audio rendering device 10 by a wired link.

Also, the exemplary embodiments have been described by focusing on the fact that the wireless links are Bluetooth links. However, in other embodiments, it is also possible to use other wireless communication protocols. In some embodiments, the audio rendering device 10 may even support a plurality of wireless communication protocols, and may use different wireless communication protocols to connect wirelessly to different devices. For instance, the audio rendering device 10 may connect to the audio configurator device 20 via a Bluetooth link and may connect to an audio stream source device via a Wi-Fi link, etc.

What is claimed is:

1. An audio configurator device comprising a processing circuit, a user interface and a wireless communication unit for establishing a wireless link with an audio rendering device adapted for playing audio streams, wherein said audio configurator device is configured to:
   receive, by the user interface, an input from a user;
   configure, by the processing circuit and based on the received input, an audio stream prioritization policy to be used by the audio rendering device for prioritizing different audio streams, wherein the audio stream prioritization policy includes one or more lists of associations between audio stream attributes and priority values; and
   transmit, by the wireless communication unit, the audio stream prioritization policy to the audio rendering device.

2. The audio configurator device according to claim 1, wherein each audio stream attribute corresponds to one of:
   an identifier of an audio stream source device;
   an identifier of a type of audio stream source devices;
   an identifier of an audio stream content provider; and
   an identifier of a type of audio stream contents.

3. The audio configurator device according to claim 1, wherein:
   the audio stream attributes are listed in two or more lists of the audio stream prioritization policy in association with the priority values; and
   the two or more lists have different priority levels.

4. The audio configurator device according to claim 1, configured to:
   receive, by the wireless communication unit and from the audio rendering device, a proposed audio stream prioritization policy received by said audio rendering device from another audio configurator device;
   present, by the user interface, the proposed audio stream prioritization policy to the user;

receive, by the user interface, feedback information regarding acceptance or rejection of the proposed audio stream prioritization policy; and transmit, by the wireless communication unit, the feedback information to the audio rendering device.

5. The audio configurator device according to claim 4, wherein the audio stream prioritization policy is updated based on the feedback information transmitted by the audio configurator device.

6. The audio configurator device according to claim 1, wherein the audio configurator device is integrated in an audio stream source device.

7. The audio configurator device according to claim 1, wherein communication with the audio rendering device is performed with a Bluetooth Low Energy Generic Attribute-based profile.

8. The audio configurator device according to claim 1, wherein the user interface is a graphical interface and/or a vocal interface.

9. A method for configuring, by an audio configurator device, an audio rendering device connected to the audio configurator device by a wireless link, wherein said method comprises steps of:

receiving an input from a user via a user interface;

configuring, based on the received input, an audio stream prioritization policy to be used by the audio rendering device for prioritizing different audio streams, wherein the audio stream prioritization policy includes one or more lists of associations between audio stream attributes and priority values; and transmitting the audio stream prioritization policy to the audio rendering device.

10. The method according to claim 9, wherein each audio stream attribute corresponds to one of:

an identifier of an audio stream source device;
an identifier of a type of audio stream source device;
an identifier of an audio stream content provider; and
an identifier of a type of audio stream contents.

11. The method according to claim 9, wherein:

the audio stream attributes are listed in two or more lists of the audio stream prioritization policy in association with the priority values; and the two or more lists have different priority levels.

12. The method according to claim 9, further comprising:

receiving, from the audio rendering device, a proposed audio stream prioritization policy received by said audio rendering device from another audio configurator device;

presenting, by the user interface, the proposed audio stream prioritization policy to the user;

receiving, by the user interface, feedback information regarding acceptance or rejection of the proposed audio stream prioritization policy; and transmitting the feedback information to the audio rendering device.

13. The method according to claim 12, wherein the audio stream prioritization policy is updated based on the feedback information transmitted by the audio configurator device.

14. The method according to claim 9, wherein the audio configurator device is integrated in an audio stream source device.

15. The method according to claim 9, wherein communication with the audio rendering device is performed with a Bluetooth Low Energy Generic Attribute-based profile.

16. The method according to claim 9, wherein the user interface is a graphical interface and/or a vocal interface.

17. Non-transitory computer-readable media storing instructions which, when executed by an audio configurator device comprising a user interface, a processing circuit and a wireless communication unit for establishing wireless links, cause said audio configurator device to:

receive, by the user interface, an input from a user;

configure, by the processing circuit and based on the received input, an audio stream prioritization policy to be used by an audio rendering device for prioritizing different audio streams, wherein the audio stream prioritization policy includes one or more lists of associations between audio stream attributes and priority values; and transmit, by the wireless communication unit, the audio stream prioritization policy to the audio rendering device.

18. The non-transitory computer-readable media according to claim 17, wherein each audio stream attribute corresponds to one of:

an identifier of an audio stream source device;
an identifier of a type of audio stream source devices;
an identifier of an audio stream content provider; and
an identifier of a type of audio stream contents.

19. The non-transitory computer-readable media according to claim 17, wherein:

the audio stream attributes are listed in two or more lists of the audio stream prioritization policy in association with the priority values; and the two or more lists have different priority levels.

20. The non-transitory computer-readable media according to claim 17 further storing instructions to cause the audio configurator device to:

receive, from the audio rendering device, a proposed audio stream prioritization policy received by said audio rendering device from another audio configurator device;

present, by the user interface, the proposed audio stream prioritization policy to the user;

receive, by the user interface, feedback information regarding acceptance or rejection of the proposed audio stream prioritization policy; and transmit, by the wireless communication unit, the feedback information to the audio rendering device.

* * * * *